W. F. DEISTER.

SUPPORT FOR CONCENTRATING APPARATUS.

APPLICATION FILED SEPT. 9, 1914.

Reissued Oct. 27, 1914.

13,816.

2 SHEETS—SHEET 1.

WITNESSES

Thos. Sheridan

Alex. A. Grill

INVENTOR

William F. Deister by Dennis & Wolcott

Attys

W. F. DEISTER.

SUPPORT FOR CONCENTRATING APPARATUS.

APPLICATION FILED SEPT. 9, 1914.

Reissued Oct. 27, 1914.

13,816.

2 SHEETS—SHEET 2.

WITNESSES

Thos. B. Geyer.

Alice A. Grill

INVENTOR

William F. Deister by Dennis S. Wolcott

Atty.

UNITED STATES PATENT OFFICE.

WILLIAM F. DEISTER, OF FORT WAYNE, INDIANA, ASSIGNOR TO DEISTER MACHINE COMPANY, OF FORT WAYNE, INDIANA, A CORPORATION OF INDIANA.

SUPPORT FOR CONCENTRATING APPARATUS.

13,816. Specification of Reissued Letters Patent. Reissued Oct. 27, 1914.

Original No. 1,098,023, dated May 26, 1914, Serial No. 782,083. Application for reissue filed September 9, 1914. Serial No. 860,929.

*To all whom it may concern:*

Be it known that I, WILLIAM F. DEISTER, residing at Fort Wayne, in the county of Allen and State of Indiana, a citizen of the United States, have invented or discovered certain new and useful Improvements in Supports for Concentrating Apparatus, of which improvements the following is a specification.

The invention described herein relates to certain improvements in supports for concentrating tables or a unit consisting of a plurality of superposed tables, such as shown and described in application Serial No. 779,932 filed July 19, 1913.

The invention is hereinafter more fully described and claimed.

Figure 1:
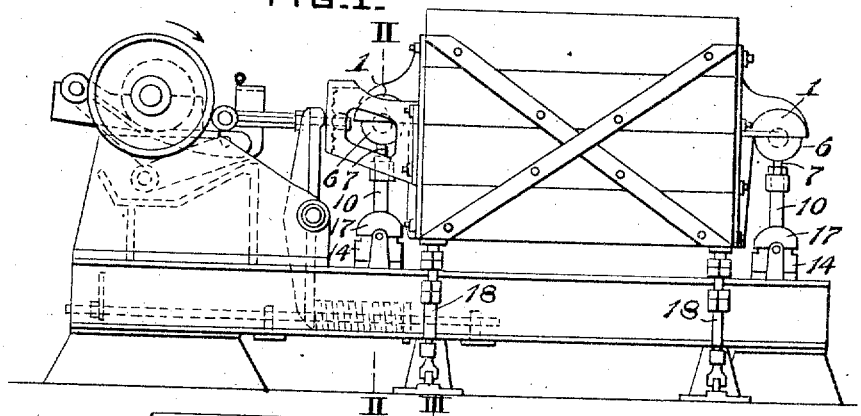
Figure 2:
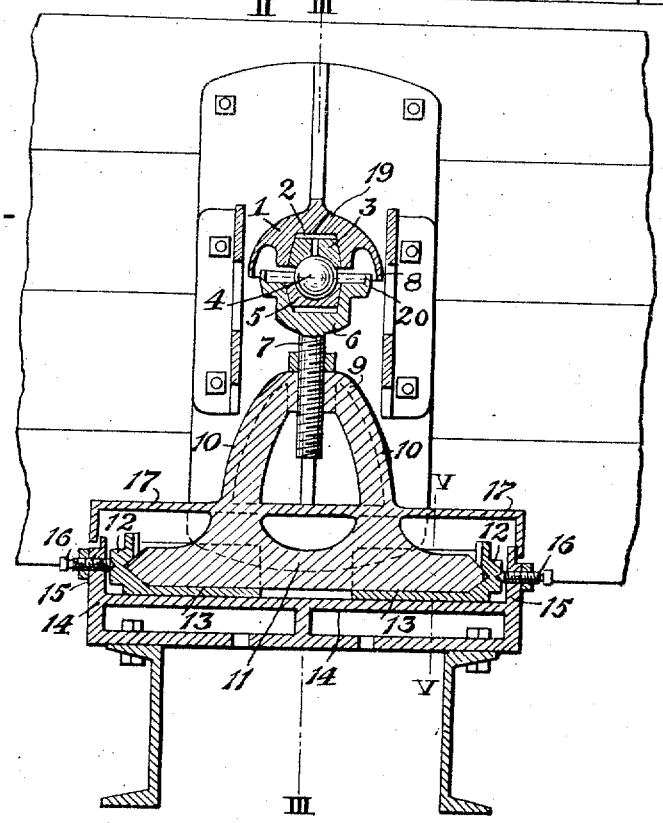
Figure 3:
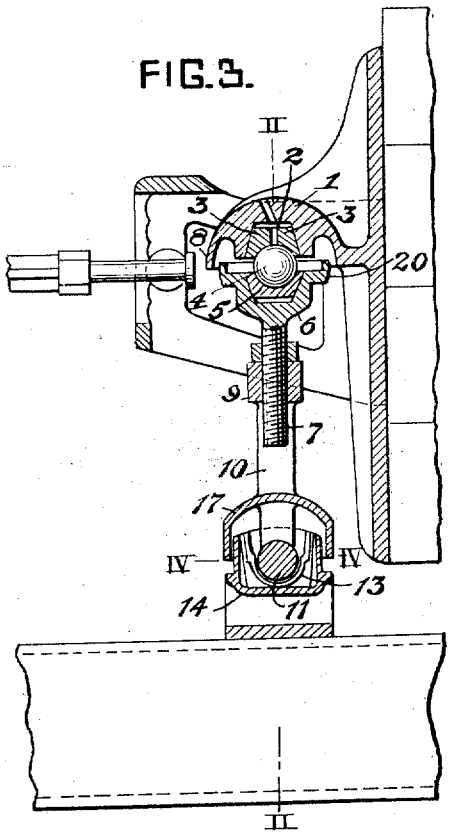
Figure 5:
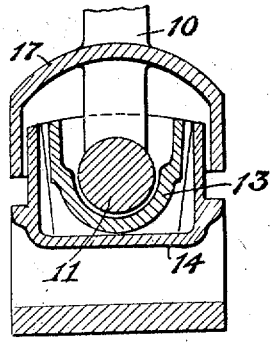
Figure 4:
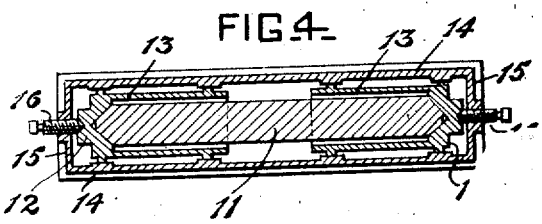

In the accompanying drawings forming a part of this specification, Figure 1 is an end elevation of a concentrating unit consisting of a plurality of decks and resting on my improved supports; Fig. 2 is a sectional view on an enlarged scale, the plane of section being indicated by the line II—II Fig. 1; Figs. 3 and 5 are sectional views on planes indicated respectively by the lines III—III and V—V Fig. 2, and Fig. 4 is a sectional plan view on a plane indicated by the line IV—IV Fig. 3.

In the practice of my invention, plates having projections 1 integral therewith are secured to the sides of a table or a unit consisting of a plurality of tables as shown. The upper surfaces of these projections are rounded or dome shaped and are provided in their under sides with recesses 2 for the reception of removable hardened metal blocks 3 having a semicircular recess for the reception of a ball 4 forming the immediate support of the plate 1 and any part to which it may be attached. The ball in turn rests in a semicircular recess in a block 5 arranged in a socket in the head 6 which is provided with a threaded stem 7. As clearly shown in Figs. 2 and 3, the head 6 is made of a smaller diameter than the semicircular projection 1 and the latter is provided with a peripheral skirt 8 extending down around the upper end of the head 6 to protect the latter from dirt. The stem 7 engages a threaded opening in the enlargement 9 at the junction of the arms 10 secured to or formed integral with a cylindrical member 11 having conical ends adapted to engage correspondingly shaped recesses in the end walls of the U-shaped shoes 13. These shoes are first applied to the opposite ends of the cylinder 11, which with the shoes is then placed in position in the trough 14 having end walls 15. The shoes within which the cylinder rocks, are adjusted and held in proper relation to the ends of the cylinder by set screws 16 passing through threaded openings in the end walls of the trough 14 as clearly shown in Fig. 4. These set screws also serve to adjust the cylinder and shoes endwise of the trough or base to bring the seats in the blocks 3 and 5 into proper alinement respectively.

In order to protect the parts within the trough 14, a box 17 having an open lower side is carried by the arms 10, being preferably formed integral with arms and cylinder as shown, and adapted to extend down outside of the upper portion of the trough as shown in Figs. 2 and 3.

By reference to Fig. 1 it will be seen that my improved supports are employed as auxiliaries to the adjustable corner supports 18 employed in connection with single deck concentrators, and which in such cases are sufficiently strong to carry the load. But when four or more decks are superposed one above the other forming a unitary structure it has been found advisable to employ auxiliary supports arranged midway of the length of structure and on opposite sides thereof as shown in Fig. 1. As the unit is vibrated transversely, the cylinders 11 will rock on the bearings formed by the shoes. The universal bearings formed by the balls 4 will prevent any straining of the structure as it is vibrated and will also allow of the change of this unit incident to its adjustment to the desired longitudinal inclination as described in the application referred to. The universal bearing will also permit of the rotation of the head 6 to adjust the length of the supports.

As shown in Fig. 2, openings 19 are formed through the boss or projection 1 to lubricate the parts of the universal bearing and the head 6 is provided with a peripheral rim 20 to retain the lubricant around the ball. When in operation the trough 14 will be charged to sufficient depth to lubricate the bearings of the cylinders.

It is characteristic of the support described herein that the universal bearings adjacent to the upper ends of the support permit of the adjustment of the table or tables to the desired inclination, and also permit of the vibration of the table around the axes of the journals or cylindrical portions of the support without any straining of the connections of the support to the table. The shoes form bearings for the journals of the rocking portion of the support, such journals being the cylindrical portions resting in the shoes. The shoes or bearings and journals are inclosed in the trough or base, whereby the shoes are held in proper relation to the journals, and the base or trough is constructed to contain a suitable lubricant for the wearing surfaces of the moving parts. In order to protect the bearing surfaces the movable portions of the support are provided with curtains which extend over and down outside of the shoe-containing portions of the base.

It is characteristic of the improved support, that portions contiguous to all the bearings, where two surfaces move relatively one to the other, are so constructed as to form walls so inclosing such bearing that surfaces subjected to wear will be immersed in the lubricant contained in the receptacles formed by the inclosing walls. And further in addition to insuring the lubrication of the bearings provision is made for protecting the several bearings from dirt, etc., by hoods or covers carried by the parts above and movable on the bearings, and so constructed that in all portions of the movable parts dirt will be prevented from dropping into the lubricant around the bearing.

I claim herein as my invention:

1. A supporting standard having in combination two parts or members having recesses in their adjacent faces, one of said members being adapted to be attached to the article to be supported, blocks having circular seats removably arranged in said recesses, a ball arranged in the circular seats in the blocks, a cylinder carrying the other part or member, and bearings for the cylinder adapted to permit of its oscillation around its axis.

2. A supporting standard having in combination two parts or members having circular recesses in their adjacent faces, the upper part or member having a downwardly extending curtain and the under part or member provided with a peripheral rim projecting up within the curtain, a ball arranged in the recesses in said parts or members, a cylinder, an extensible connection between the cylinder and the lower part or member, and bearings for the cylinder adapted to permit of its oscillation around its axis.

3. A supporting standard, having in combination a cylinder, shoes provided with bearings for the ends of the cylinder, a trough for holding the shoes in proper relation to the cylinder, and an arm extending radially from the cylinder and adapted to be attached to the article to be supported.

4. A supporting standard, having in combination a cylinder provided with conical ends, shoes having conical recesses for the reception of the ends of the cylinder, a trough for holding the shoes in proper relation to the cylinder, and an arm extending radially from the cylinder and adapted to be connected to the article to be supported.

5. A supporting standard, having in combination a cylinder, shoes provided with bearings for the cylinder, a trough for holding the shoes in proper relation to the cylinder, an arm extending radially from the cylinder, and adapted to be attached to the article to be supported, and a box carried by the cylinder and inclosing the upper portion of the trough.

6. A supporting standard having in combination, an arm adapted to be attached to the article to be supported, journals carried by said arm, independent shoes for the reception of said journals, and a base adapted to receive the shoes and journals and hold them in operative relation.

7. A supporting standard having in combination, an arm adapted to be attached to the article to be supported, journals carried by said arm, shoes for the reception of said journals, a base for the reception of the shoes and journals and constructed to contain a lubricant for the moving parts, and curtain walls carried by the arm and extending down outside the lubricant containing portions.

8. In a rocking end support for concentrating tables, the combination of a trough, a shaft arranged longitudinally of the trough and provided with an upwardly projecting arm, bearings for the ends of the shaft so arranged in the trough as to be lubricated by the oil in the trough and a hood carried by the arm and extending laterally and downwardly to prevent the entrance of dust, etc., into the trough.

9. In a rocking end support for concentrating tables, the combination of a trough, an arm provided at its lower end with oppositely disposed journals, a hood secured to the arm above the journals, and bearings for the journals arranged within the trough, the hood being adapted to move with the arm independent of the trough, and in all positions to prevent the entrance of dirt into the trough.

10. In a rocking end support for concentrating tables, the combination of an arm provided at its lower end with oppositely disposed journals, a hood formed integral with the arm, and bearings for the journals, the hood being adapted to protect the journals and bearings in all positions of the arm.

11. In a rocking end support for concentrating tables, the combination of a trough, bearings inclosed by the trough, a shaft having its end portions journaled in the bearings, an arm extending from the shaft, a suitable distance above the trough, and a hood movable with the arm and extending laterally beyond the open part of the trough through which the arm projects.

In testimony whereof I have hereunto set my hand.

WILLIAM F. DEISTER.

Witnesses:
HAZEL M. REID,
RALPH L. FEAGLES.